Oct. 2, 1962 A. MELCHIOR 3,056,269
REGENERATION SYSTEM FOR GAS FRACTIONATING
DEVICES AND THE LIKE
Filed Feb. 24, 1959 3 Sheets-Sheet 1

Inventor:
Alexander Melchior
BY Michael S Striker
Attorney

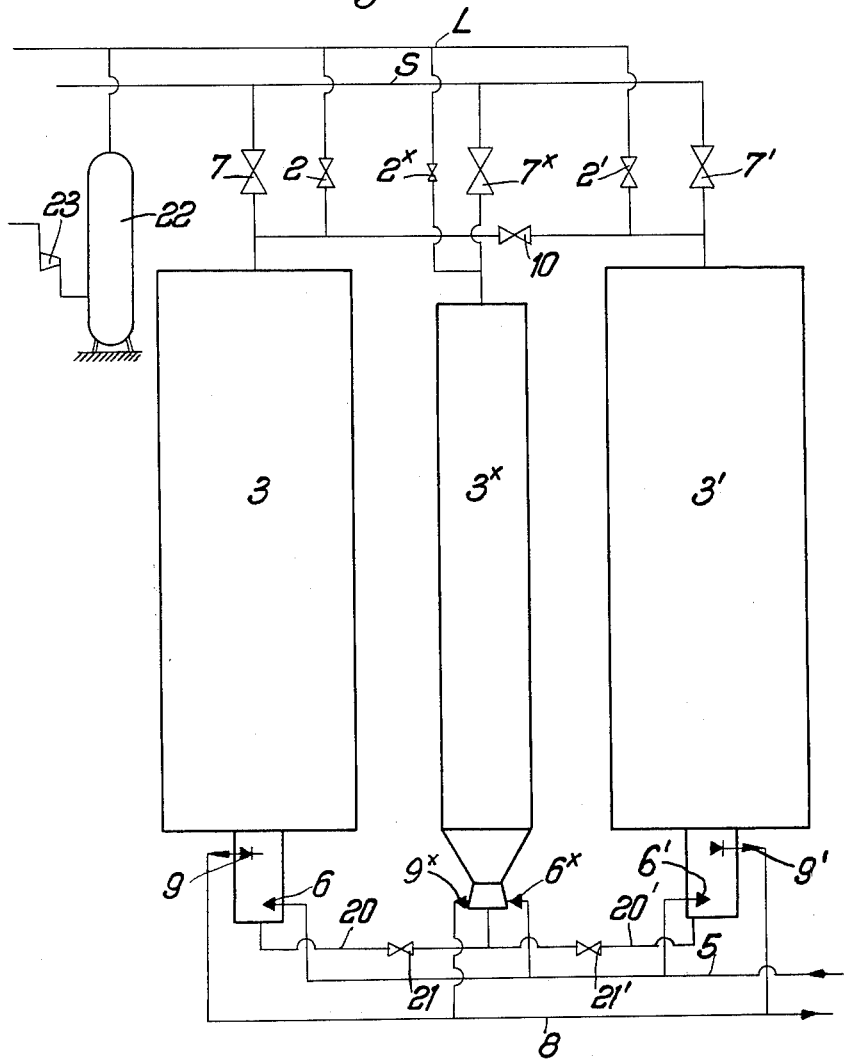

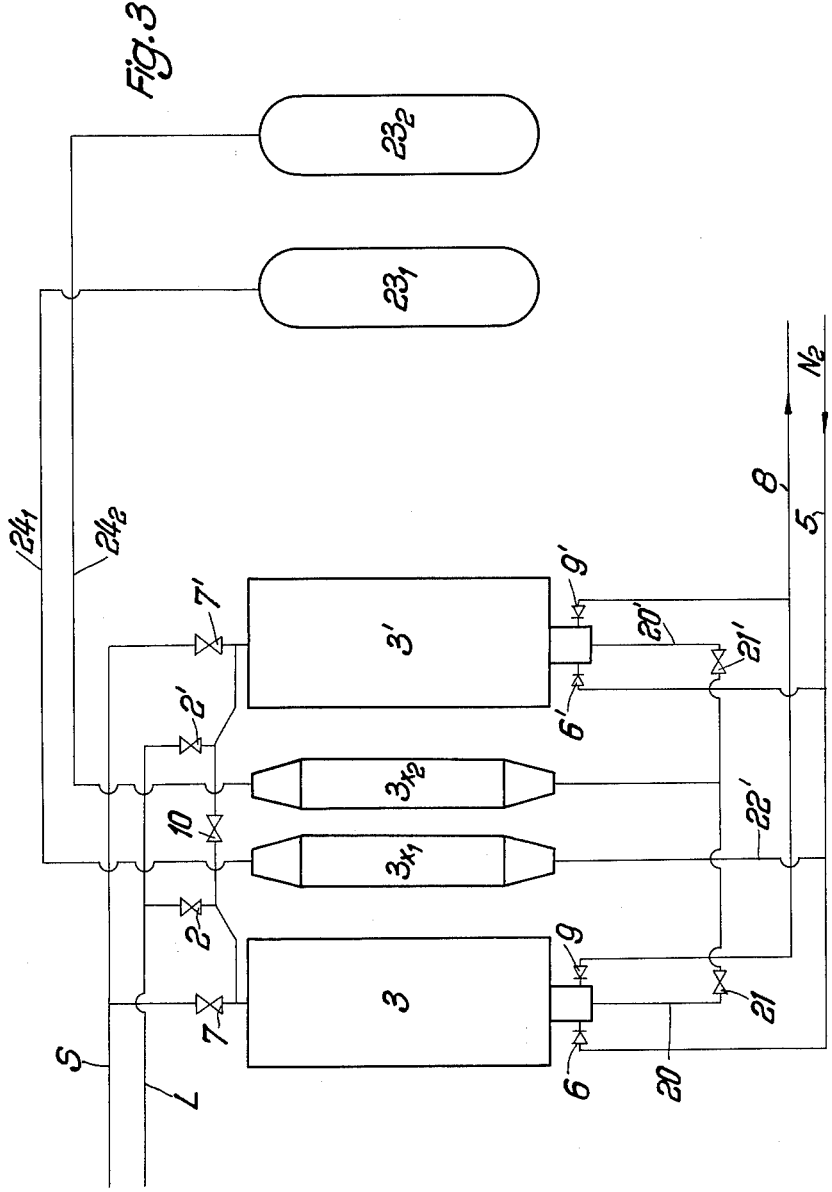

United States Patent Office 3,056,269
Patented Oct. 2, 1962

3,056,269
REGENERATION SYSTEM FOR GAS FRACTIONATING DEVICES AND THE LIKE
Alexander Melchior, Hagen-Haspe, Germany, assignor to Klöckner-Hüttenwerk Haspe AG., Hagen-Haspe, Germany
Filed Feb. 24, 1959, Ser. No. 795,147
Claims priority, application Germany Feb. 22, 1958
7 Claims. (Cl. 62—44)

The present invention relates to a regeneration system and more particularly to a regeneration system suitable for a liquefied-gas fractionating plant.

In fractionating plants for liquefied gases of which plants for the production of oxygen and nitrogen from air by liquefaction and fractionation are typical, it is necessary to cool the entering raw gas to be liquefied, such as air, by heat exchange with at least one of the fractionation products to the lowest possible temperature in order to make the operation of such a plant economical. In an oxygen plant of the type described, the incoming air is cooled essentially to liquefaction temperature by outgoing nitrogen.

Commercial oxygen plants generally operate according to a modified Linde-Frankl cycle and employ paired regenerators. At least two regenerators are required since they operate in a discontinuous manner. At any one time, one regenerator is heated by a stream of incoming air whereas the other one is cooled by the product. At predetermined intervals, the functions of the two regenerators are interchanged by switching the streams of fluid, and such switching involves a number of disadvantages.

It is necessary in conventional plants of the Linde-Frankl type to interrupt the fractionation process during the switching-over of the regenerators.

When one of the regenerators is switched from operation with nitrogen product to operation with incoming air, as is required in many plants operating on the Linde-Frankl cycle, the residual nitrogen contained in the regenerator at switching time not only is not available as a useful product, but it is returned with the entering air to the high pressure portion of the fractionating column where it does not contribute to the production of oxygen, and is an undesirable diluent.

During switching of a generator from air to nitrogen product operation, the energy stored as pressure in the entering air is partly lost.

It is the object of the present invention to overcome the shortcomings inherent in the afore-described alternating operation of paired regenerators.

Another object is to provide a regeneration system in which thermal energy is utilized in a very economical manner.

With these and other objects in view, the invention provides one or several auxiliary regenerator means adapted for cooperation with paired main regenerators in such a manner that the nitrogen product may freely pass through the auxiliary regenerator means during the switching over of the main regenerators and that the nitrogen may be transferred into an output line from a main regenerator while the latter is being switched over from nitrogen product operation to the cooling of incoming air.

According to a preferred feature of the invention, the auxiliary regenerator or regenerators are adapted to be connected alternatingly to one of the main regenerators by a conduit having a control valve arranged therein which is operatively connected to a bypass valve arranged in a bypass line and connecting the paired main regenerators, so that the afore-mentioned control valve is opened and closed in unison with the opening and closing step of the bypass valve which is a necessary step in the switching of the regenerators. The operative connection between the two valves may be achieved by common mechanical, electromagnetic or other actuating means of a type well known in itself.

According to another specific feature of this invention, a connecting line is provided between the auxiliary regenerator means and the nitrogen discharge line which receives nitrogen product from the main regenerators. The connecting line is equipped with a valve which is opened by common actuating means when the valves admitting air and nitrogen, respectively, to the main regenerators, are closed.

The auxiliary regenerator may further be equipped with a valve for passage of a stream of air to be cooled in the auxiliary regenerator by the negative thermal energy stored therein by previous passage of nitrogen product, i.e. by contact with the previously cooled components of the auxiliary regenerator. This valve may be controlled by a temperature-sensitive element arranged in the coldest portion of the auxiliary regenerator and adapted to actuate the aforementioned valve in a well-known manner when the temperature of said portion of the auxiliary regenerator reaches a predetermined value so as to interrupt the stream of air.

The auxiliary regenerator means may be suitably arranged to provide separate paths of flow for the nitrogen withdrawn from the low-pressure portion of the fractionating column and for the nitrogen being purged from a main regenerator which is being switched over to air operation.

In order to assure complete and rapid transfer of the nitrogen from the regenerator which is being purged for air operation to the auxiliary regenerator, and to prevent build-up of back pressure in the line towards the low-pressure section of the fractionating column, the conduit leading from the regenerator being purged to the auxiliary regenerator is connected in a preferred embodiment of the invention with the nitrogen conduit carrying nitrogen from the low-pressure portion of the fractionating column to the auxiliary regenerator by a jet-type injector. The nitrogen coming from the fractionator is injected into a Venturi nozzle and draws the lower-pressure fluid from the main regenerator which is being purged.

The auxiliary regenerator may be completely or partly constructed like the conventional tubular heat exchanger.

In a preferred embodiment of the invention, the auxiliary generator or regenerators of the invention communicate with respective expansion vessels adapted to receive the nitrogen passing through the auxiliary regenerator means and suitably dimensioned that the nitrogen may be stored therein during a portion of the regeneration cycle without undergoing a substantial increase in pressure.

When a regenerating system is equipped with two of the auxiliary regenerators of the invention, one may be arranged to accommodate the stream of nitrogen flowing from the low-pressure portion of the fractionator, whereas the second auxiliary regenerator serves for passage therethrough of the nitrogen intermittently purged from a main regenerator while the main regenerator is being switched from nitrogen to air operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 illustrates schematically an embodiment of the regenerating arrangement of the invention; and FIG. 3 is a schematic representation of another embodiment of the invention.

Figure 1:
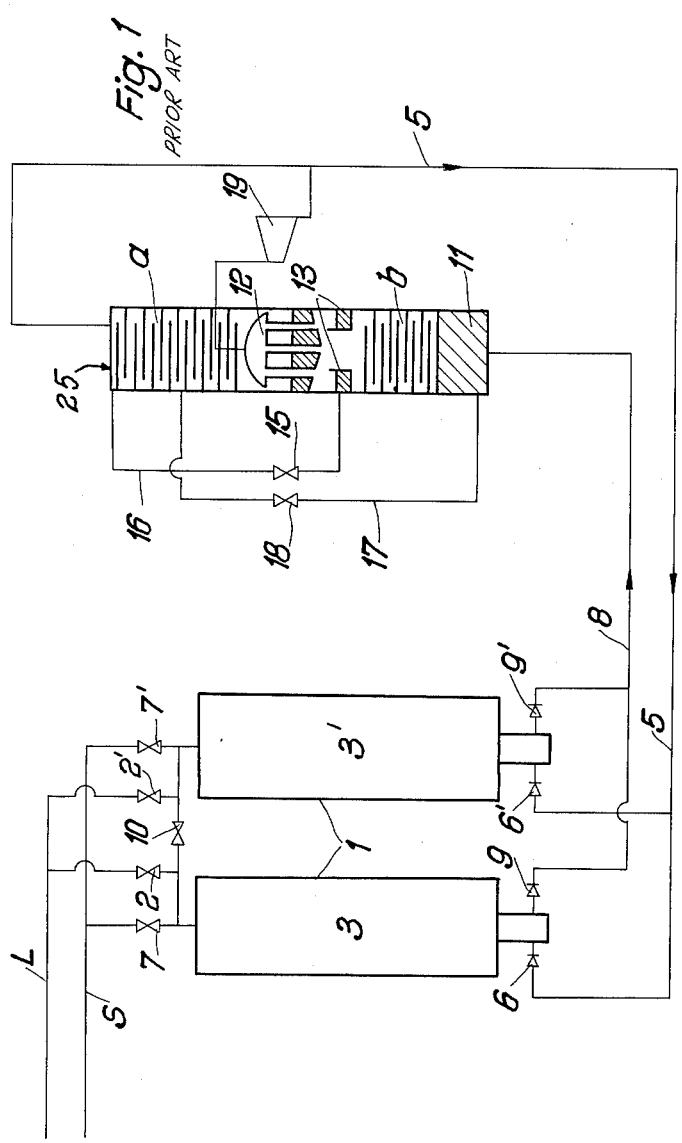
FIG. 1 is a somewhat schematic representation of an example of a conventional air fractionating plant of the Linde-Frankl type to be equipped with the regenerating arrangement of the invention.

Referring now to the drawings, and more specifically to FIG. 1, which illustrates a substantially conventional plant, there is shown a compressed air line L having two branch lines or conduits equipped with air valves 2 and 2' for controlling admission of compressed air to the main regenerators 3 and 3', respectively, of a regeneration system 1. The regenerators 3 and 3' are connected to a nitrogen product line S by means of nitrogen control valves 7 and 7', respectively. A fractionating column 25 having a high-pressure portion $b$ and a low-pressure portion $a$ is connected to the regenerators 3 and 3' by means of a low-pressure line 5 communicating with the low-pressure portion $a$ and connected to the regenerators 3 and 3' by means of check valves 6 and 6' which permit passage of fluid only in the direction from the low-pressure line 5 to the regenerators. Similarly, the high-pressure portion $b$ of the fractionating column 25 is connected to the regenerators 3 and 3' by a high-pressure line 8 which communicates with the regenerators 3 and 3' by means of respective check valves 9 and 9' so as to permit flow of fluid only in a direction from a regenerator to the high-pressure line 8. The low-pressure portion $a$ constitutes a source of nitrogen which, through connecting means 5, may communicate with the one or the other of regenerators 3, 3' depending on the position of the control valves 6, 6', respectively.

The fractionating column 25 is equipped with an intercolumn reboiler-condenser 12 arranged between the low-pressure and the high-pressure portion of the column, and with annular troughs 13 arranged underneath the condenser 12 for collecting the condensate formed thereon. The troughs 13 communicate with the head of the low-pressure portion $a$ of the fractionating column by means of a condensate line 16 equipped with a condensate valve 15.

An oxygen sump 11 is provided at the bottom of the high-pressure portion $b$ of the fractionating column and communicates with the low-pressure portion or source $a$ at an intermediate level by means of a reflux line 17 controlled by a reflux valve 18.

The afore-described plant operates as follows:

Air compressed to a pressure of approximately 90 lbs. per square inch is admitted through the valve 2' into the regenerator 3' while valve 2 is closed. At the same time, nitrogen leaving the source $a$ of the fractionating column 25 through the low-pressure line 5 enters the regenerator 3 through the check valve 6. Since the nitrogen is almost at its liquefaction temperature, the lower part of the regenerator 3 is cooled to approximately −172° C. while the nitrogen passes through valve 7 to the nitrogen product line S. Valves 7' and 10 remain closed, as do check valves 6' and 9 because of the pressure differential between the lines 5 and 8.

When the regenerator 3 has stored a sufficient amount of negative energy as it is cooled by the passing nitrogen stream, the regenerators are switched. For this purpose, valves 2, 2', 7, and 7' are held closed while the bypass valve 10 is opened to permit equalization of the pressures prevailing in the regenerators 3 and 3'. Since the regenerator 3' is under the compressed air line pressure of approximately 90 lbs. per square inch, the air flows from the regenerator 3' to the regenerator 3 and purges the nitrogen contained therein towards the high-pressure line 8. As soon as the pressure in the regenerators becomes substantially equal, the valve 10 is closed and the valves 2 and 7' are opened.

Air entering from the compressed air line into the regenerator 3 forces the nitrogen originally contained in this regenerator through the high-pressure line 8 into the oxygen sump 11. During an initial period following the switching-over of the regenerators, relatively pure nitrogen is fed to the oxygen sump 11 instead of air and dilutes the enriched oxygen collected therein.

The period during which nitrogen is fed to the fractionating column is thus not utilized for productive purposes and the overall efficiency of the plant is reduced correspondingly. The nitrogen, furthermore, interferes with rectification of the enriched oxygen and increases the condensation load on the condenser-reboiler 12 without at the same time providing a corresponding amount of liquefied oxygen for refluxing purposes in the low-pressure portion $a$.

The nitrogen separated from the air in the fractionating column 25 is led to one of the regenerators 3, 3' from the low-pressure portion $a$ of the column through the low-pressure line 5. Means for withdrawing and further processing the oxygen substantially free of nitrogen have not been shown since they are well known in themselves and are not required for illustration of the features of the present invention.

A turbo-expander 19 is commonly arranged in communication with the low-pressure portion of the equipment to recover some of the energy of the product gas. It is apparent that no product gas can flow through the turbo-expander during the switching-over of the regenerators 3 and 3' so that the speed of the turbo-expander 19 temporarily drops. This entails a loss of negative thermal energy.

The apparatus of the invention illustrated in FIG. 2 is intended to replace the regeneration system 1 and the associated control elements of the arrangement illustrated in FIG. 1. In this schematic representation of a preferred embodiment of the present invention, there is shown a pair of main regenerators 3 and 3' respectively connected to a compressed air line L and a nitrogen product line S by means of valves 2, 2', 7 and 7' and connected to each other by a bypass valve 10. The regenerators 3 and 3' are further connected to the high- and low-pressure portions of the fractionating column by means of high- and low-pressure lines or conduits 5 and 8 through check valves 6, 6', 9, and 9', in the manner described in connection with the apparatus illustrated in FIG. 1.

An auxiliary regenerator $3^x$ is arranged in parallel with the main regenerators 3 and 3' to the compressed air line L and the nitrogen product line S by means of respective valves $2^x$ and $7^x$. A check valve $6^x$ permits fluid flow from the low-pressure line 5 toward the auxiliary regenerators $3^x$ only and a check valve $9^x$ permits flow from the auxiliary regenerator towards the high-pressure line 8. Bypass lines 20 and 20' respectively connect the main regenerator 3 to the auxiliary regenerator $3^x$, and the latter to the regenerator 3'. Control valves 21 and 21' are respectively inserted in the bypass lines 20 and 20' between the auxiliary regenerator $3^x$ and the main regenerators 3 and 3'.

Compressed air is supplied to the compressed air line L from a source shown as a storage tank 22 which is fed by a turbo-compressor diagrammatically indicated at 23.

The apparatus illustrated in FIG. 2 operates as follows:

During switching of the main regenerators 3 and 3' in the manner indicated in the description of the operation of the apparatus illustrated in FIG. 1, the valve $7^x$ is opened so that nitrogen may pass freely from the low-pressure portion of the fractionating column through the low-pressure line 5 and the check valve $6^x$ into the auxiliary regenerator $3^x$, and further through the open valve $7^x$ into the nitrogen product line S. Rectification in the column can thus proceed uninterrupted and the speed of the turbo-expander is not materially reduced.

At the same time, the residual nitrogen in the regenerator 3 is purged through the line 20 and the opened valve 21 into the auxiliary regenerator $3^x$ instead of being forced through the check valve 9 and the high pressure line 8 into the oxygen sump 11 of the fractionating column. Rapid transfer of the nitrogen from the main regenerator 3 to the auxiliary regenerator 3ˣ without the danger of setting up premature back pressure in the main regenerator can be assured by connecting the low-pressure line 5 with the bypass line 20 at the point at which the latter enters the auxiliary regenerator 3ˣ by means of a jet-type injector in which the nitrogen in line 5 which is under higher pressure is injected into a Venturi nozzle to draw the fluid from the main regenerator 3.

The negative thermal energy stored in the auxiliary regenerator 3ˣ during the passage therethrough of nitrogen almost at its liquefaction temperature is utilized by passing compressed air from line L through valve 2ˣ into auxiliary regenerator 3ˣ. As pressure in 3ˣ now surmounts pressure in line 8, valve 9ˣ is opened and compressed air may be diverted from the main regenerator operating on air through valve 2ˣ, the auxiliary generator 3ˣ and the high-pressure line 8 into the oxygen sump 11 of the fractionating column. The valve 2ˣ is preferably controlled by a temperature-sensitive actuator which closes the valve 2ˣ when the temperature of a portion of the auxiliary regenerator 3ˣ at which the sensing element of the actuator is located reaches a predetermined maximum temperature.

The control valves 21 and 21′ in the bypass lines 20 and 20′ are preferably equipped with automatic actuating means, known per se and of a mechanical, electromagnetic, or any other type, for opening the valves either simultaneously with or promptly after opening of the bypass valve 10 or after closing of the valves 2, 2′, 7, and 7′. The nitrogen valve 7ˣ may be connected with the nitrogen valves 7 and 7′ for closing by common actuating means. The valves may, for example, be solenoid-actuated and controlled by a common switch relay.

The various conduits including the lines L, S, 5, 8, 20 and 20′ constitute connecting means between the two gas sources 22, a and the regenerators, 3, 3′, 3ˣ, between the regenerators 3, 3′, and between the regenerators 3, 3′ and the auxiliary regenerator 3ˣ. The various valves constitute control means in the connecting means for communicatively connecting the main regenerators with the two sources, with each other or with the auxiliary regenerator, and for communicatively connecting the auxiliary regenerator with the one or the other source.

FIG. 3 illustrates another embodiment of the invention in diagrammatic representation. In the example illustrated, the regeneration system includes two auxiliary regenerators 3ₓ₁ and 3ₓ₂, each of which is provided with a respective expansion vessel 23₁ and 23₂.

The auxiliary regenerator 3ₓ₁ is connected by means of a conduit 22′ with the low-pressure line 5 so as to receive the nitrogen developed in the fractionating column while the main regenerators 3 and 3′ are blocked during the switching operation. The auxiliary regenerator 3ₓ₂ is connected with the two main regenerators 3 and 3′ by bypass lines 20 and 20′ having respective control valves 21, 21′ in the manner indicated in the description of FIG. 2. As described above, this arrangement serves for providing an outlet for the residual nitrogen in either one of the main regenerators while the latter is purged of nitrogen by compressed air during the switching-over of the main regenerators.

While it would be feasible to store the nitrogen at a low temperature in suitable containers during the switching operation and to return it to the system after switching, such an arrangement is not preferred. It would require containers of dimensions which would not be practical because of high losses of negative thermal energy.

With the embodiment of the invention illustrated in FIG. 3, the nitrogen is led from the auxiliary regenerators to the expansion vessels 23₁ and 23₂, respectively, by transfer lines 24₁ and 24₂ and is returned automatically to the auxiliary generators where it is returned to its previous low temperature and is passed on under its own pressure to that one of the regenerators 3 and 3′ which is operating at low pressure with nitrogen.

The relatively small thermal losses in the auxiliary regenerators do not substantially influence the economics of the process and the provision of relatively large expansion vessels 23₁ and 23₂ in which the gas is stored substantially at ambient temperature has been found entirely practical.

The embodiment of the invention illustrated in FIG. 3 has a number of additional advantages. It is apparent that the auxiliary regenerators receive and return the negative thermal energy exclusively in contact with a stream of nitrogen. There are no contamination losses which are inherent even in the switching of a small auxiliary regenerator from air to nitrogen operation and vice versa. The size of the auxiliary regenerators 3ₓ₁ and 3ₓ₂ is thus not particularly critical. The auxiliary regenerators furthermore are exposed only to the low pressure of the nitrogen and may be built lighter than would be necessary if they had to withstand the full pressure of the compressed air line. The same holds true for the expansion vessels cooperating with the auxiliary regenerators.

The controls of the embodiment of the invention shown in FIG. 3 are particularly simple. As is evident from the drawing, no control valves are required at either the cold or the warm end of the auxiliary regenerator 3ₓ₁. The auxiliary regenerator 3ₓ₂ requires only the control valves 21 and 21′ at the cold end of the regenerator. The operating condition of the system illustrated in FIG. 3 is, furthermore, conveniently ascertained by measurement of the pressures prevailing in the expansion vessels 23₁ and 23₂.

It will be understood that each of the elements described above, or two or more together, may also find a useful application in other types of regeneration equipment differing from the types described above.

While the invention has been illustrated and described as embodied in plant for fractionation of liquid air, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a regenerating system, in combination, a first source of a first gas; a second source of a second gas; a first and a second main regenerator; auxiliary regenerator means; first conduit means for connecting said first source with said main regenerators; second conduit means for connecting said second source with said main regenerators and with said auxiliary regenerator means; third conduit means for connecting said main regenerators only with each other and with said auxiliary regenerator means; fourth conduit means for discharging the second gas from said main regenerators; control means in said conduit means for permitting the regulation of gas flow in such a way that in one stage of the operation the first gas may flow through one of said main regenerators to said second source and the second gas may flow through the other main regenerator to said fourth conduit means, and that in another stage of the operation the second gas may flow from the second source and from the other main regenerator to said auxiliary regenerator means; and exhaust means associated with said auxiliary regenerator means for the passage of said second gas therethrough when the latter is diverted through said auxiliary regenerator means.

2. The combination as set forth in claim 1, further comprising fifth conduit means for connecting said main regenerators with each other, with said first conduit means, and with said fourth conduit means.

3. The combination as set forth in claim 1, wherein said first conduit means is connected with said auxiliary regenerator means and said control means comprises valve means for regulating the flow of the first gas through said auxiliary regenerator means to said second source.

4. The combination as set forth in claim 1, wherein said fourth conduit means is connected with said auxiliary regenerator means and said control means comprises valve means for regulating the flow of the second gas through said auxiliary regenerator means to said fourth conduit means.

5. The combination as set forth in claim 1, wherein said first and second gas are respectively air and nitrogen, said first source comprising an air compressor and said second source comprising a column in which the air delivered by said second conduit means is fractionated into oxygen and nitrogen.

6. The combination as set forth in claim 1, wherein said auxiliary regenerator means comprises a first and a second auxiliary regenerator, said second conduit means connected with one of said auxiliary regenerators and said third conduit means connected with the other auxiliary regenerator.

7. The combination as set forth in claim 4, wherein each of said auxiliary regenerators comprises an expansion vessel for respectively receiving second gas from said second source and from one of said main regenerators.

References Cited in the file of this patent

UNITED STATES PATENTS

| | | |
|---|---|---|
| 2,677,252 | Rice et al. | May 4, 1954 |
| 2,715,820 | Becker | Aug. 23, 1955 |
| 2,776,092 | Collins | Jan. 1, 1957 |